No. 696,066. Patented Mar. 25, 1902.
P. S. MILLER.
PLASTERING TROWEL.
(Application filed Apr. 2, 1901.)
(No Model.)

WITNESSES:

INVENTOR
Philip S. Miller
BY
Pierre Barnes,
ATTORNEY

UNITED STATES PATENT OFFICE.

PHILIP S. MILLER, OF SEATTLE, WASHINGTON.

PLASTERING-TROWEL.

SPECIFICATION forming part of Letters Patent No. 696,066, dated March 25, 1902.

Application filed April 2, 1901. Serial No. 54,014. (No model.)

*To all whom it may concern:*

Be it known that I, PHILIP S. MILLER, a citizen of the United States, residing at Seattle, in the county of King and State of Washington, have invented certain new and useful Improvements in Plastering-Trowels, of which the following is a specification, reference being had therein to the accompanying drawings.

This invention relates to plastering-trowels, and specifically to improvements in the plastering-trowel shown and described in Letters Patent No. 636,345, granted to me November 7, 1899; and the objects of the improvements are to render the device more convenient and efficient, to reduce the cost of manufacture, to permit the change or renewal of the blade with an interchangeable handle fitted to the operator's hand, and to have the handle so mortised that it may be used with different blades having a standard height of shank, so as to make the "mount," or the space between the handle and blade, always the same with the same handle.

Figure 1:
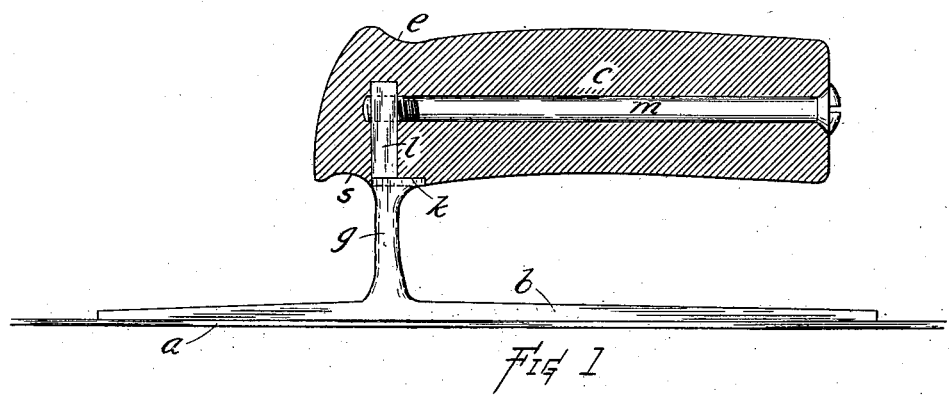
Figure 2:
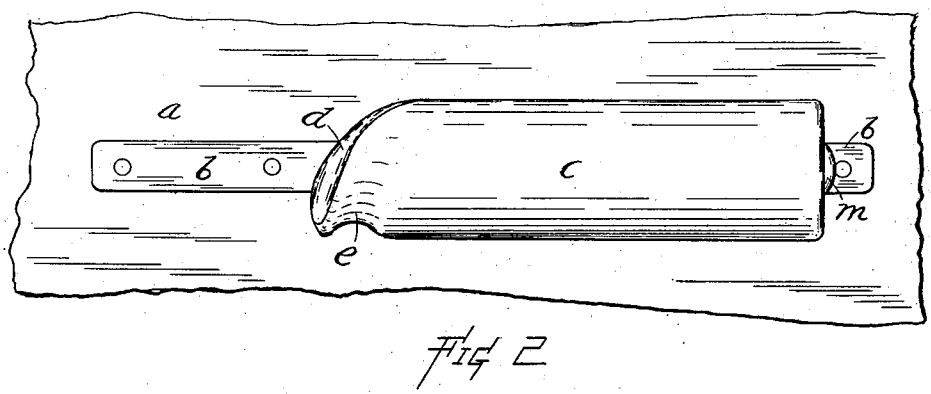
Figures 3, 4, 5:
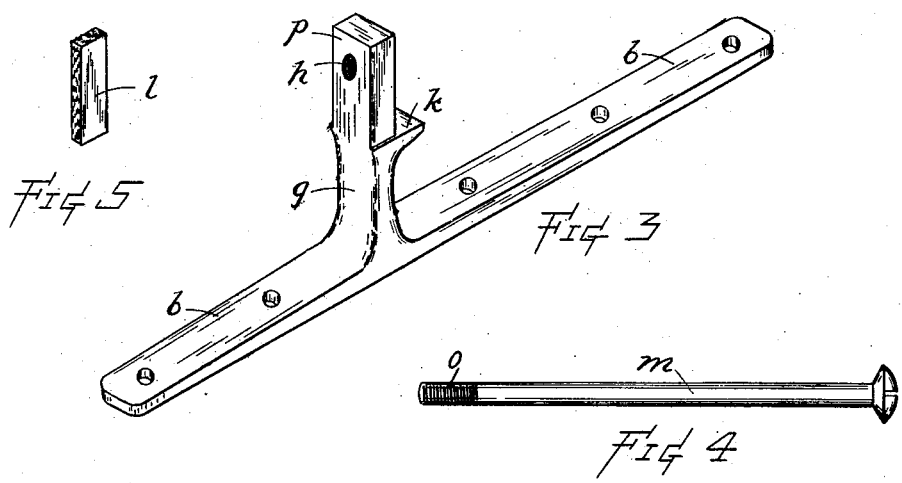

In the accompanying drawings, where similar letters indicate corresponding parts in the several views, Figure 1 is a side elevation of a portion of a trowel embodying my invention, the handle being shown in section. Fig. 2 is a plan or top view of the device. Fig. 3 is a perspective view of the trowel-stiffening rib and handle-shank. Figs. 4 and 5 are detail views of the handle-securing bolt and a packing-piece, respectively.

The improved trowel comprises a blade $a$, with a stiffening-rib $b$, having a rectangularly-disposed shank $g$ integral therewith and on the extension $p$ of which is mounted a handle $c$. The handle is mortised to register with the said shank extension over the packing-pieces $l$, of leather, preferably, which are interposed between the opposite lateral faces of the shank and the adjacent walls of the mortise, and to give the handle a firm seat I provide a horizontal shoulder $k$ upon the shank, as shown. The handle is finally secured in place by a bolt $m$, inserted longitudinally through the handle and provided with a screw-thread $o$, which engages with a registering thread in aperture $h$ in the shank extension. Instead of the thumb-bearing surfaces being formed in the shank, as in the aforesaid patent granted me, in my present invention I place the same $d$ and $e$ upon the handle itself and provide an additional under-side concave or grooved gripping-surface $s$ by projecting the handle forward of the shank and continuing the same around the projecting end to merge with the aforesaid surface $e$.

The principal advantage of the removability of the handle is that a different form or size of trowel-blade may be substituted, according to the class of work in hand or the preference of the operator, the handle being fitted to the hand and so mortised as to give the same mount to different blades.

Having thus described my invention, what I claim as new, and desire to secure by Letters Patent, is—

1. In a plastering-trowel, the combination with a blade and a stiffening-rib having a rectangular shank projecting therefrom and a shoulder or shelf thereon intermediate of the length of the shank, of a handle mortised to register over the said shank as far as the said shoulder, and formed with a thumb-bearing surface on the end of the handle, and a grooved or hollow thumb-gripping surface on the under side of the handle between the said thumb-bearing surface and the said shank, and means to secure the said handle to the said shank, substantially as described.

2. In a plastering-trowel, the combination with a blade, of a stiffening-rib having a shank projecting at a right angle therefrom and integral therewith, a shoulder on said shank intermediate of its length, a handle having on the end thereof a thumb-bearing surface and a peripheral concave thumb-gripping surface positioned between the said thumb-bearing surface and the said shank, and a bolt for securing the said handle to the said shank, substantially as described.

In testimony whereof I affix my signature in presence of two witnesses.

PHILIP S. MILLER.

Witnesses:
 PIERRE BARNES,
 ERNEST E. GILMER.